United States Patent
Majumdar

(10) Patent No.: US 6,180,716 B1
(45) Date of Patent: Jan. 30, 2001

(54) METHOD FOR ENHANCING THE SURFACE APPEARANCE OF COMPATIBILIZED POLYPHENYLENE ETHER-POLYAMIDE RESIN BLENDS

(75) Inventor: Biswaroop Majumdar, Delmar, NY (US)

(73) Assignee: General Electric Company, Pittsfield, MA (US)

( * ) Notice: Under 35 U.S.C. 154(b), the term of this patent shall be extended for 0 days.

(21) Appl. No.: 09/040,611

(22) Filed: Mar. 18, 1998

(51) Int. Cl.⁷ .............................. C08L 77/02; C08L 77/00
(52) U.S. Cl. ...................... 525/92 B; 525/92 D
(58) Field of Search ................. 525/92 B, 92 D

(56) References Cited

U.S. PATENT DOCUMENTS

| | | | |
|---|---|---|---|
| 4,315,086 | 2/1982 | Ueno | 525/391 |
| 4,654,405 | 3/1987 | Jalbert et al. | 525/391 |
| 4,732,938 | 3/1988 | Grant et al. | 525/92 B |
| 4,745,157 | 5/1988 | Yates, III et al. | 525/92 B |
| 4,798,865 | 1/1989 | Grant et al. | 525/92 B |
| 4,873,276 * | 10/1989 | Fujii | 524/153 |
| 4,873,286 | 10/1989 | Gallucci et al. | 525/92 B |
| 4,923,924 | 5/1990 | Grant et al. | 525/92 B |
| 4,960,825 | 10/1990 | van der Meer | 525/92 B |
| 4,963,620 | 10/1990 | Grant et al. | 525/68 |
| 4,970,272 | 11/1990 | Gallucci | 525/397 |
| 4,997,612 | 3/1991 | Gianchanda et al. | 264/211 |
| 5,000,897 | 3/1991 | Chambers | 264/141 |
| 5,017,652 | 5/1991 | Abe et al. | 525/68 |
| 5,162,433 | 11/1992 | Nishio et al. | 525/66 |
| 5,175,211 | 12/1992 | Sanada et al. | 525/66 |
| 5,182,336 | 1/1993 | Abe et al. | 525/132 |
| 5,288,786 | 2/1994 | Nishio et al. | 524/451 |
| 5,296,533 | 3/1994 | Nagaoka et al. | 524/430 |
| 5,451,642 | 9/1995 | Abe et al. | 525/179 |
| 5,459,189 | 10/1995 | Hagimori et al. | 524/439 |
| 5,506,305 | 4/1996 | Nagaoka et al. | 525/92 B |
| 5,554,677 | 9/1996 | Nagaoka et al. | 524/494 |
| 5,559,185 | 9/1996 | Abe et al. | 525/68 |

* cited by examiner

*Primary Examiner*—Patricia A. Short

(57) ABSTRACT

The invention relates to a method of enhancing the surface appearance of articles made from an impact modified composition of a compatibilized polyphenylene ether-polyamide resin blend. The impact modified composition contains from about 5% to less than 50% by weight polyphenylene ether resin with from about 0.7% to about 1.1% by weight of a non-polymeric aliphatic polycarboxylic acid or derivative thereof and from about 5% to about 15% by weight of an elastomeric block copolymer, and from about 45% to about 90% of a polyamide resin, wherein the polyamide resin has an amine endgroup to acid endgroup ratio of at least about 1.0, and wherein all weights are based on the total weight of the composition.

8 Claims, No Drawings

METHOD FOR ENHANCING THE SURFACE APPEARANCE OF COMPATIBILIZED POLYPHENYLENE ETHER-POLYAMIDE RESIN BLENDS

BACKGROUND OF THE INVENTION

1. Field of the Invention

The invention relates to a method of enhancing the surface appearance of articles made from an impact modified composition of a compatibilized polyphenylene ether-polyamide resin blend.

The invention also relates to the compositions and articles formed out of the compositions made by the method of the invention.

2. Brief Description of the Related Art

Poly(phenylene ether) resins (referred to hereafter as "PPE") are commercially attractive materials because of their unique combination of physical, chemical, and electrical properties. Furthermore, the combination of these resins with polyamide resins into compatibilized blends results in additional overall properties such as chemical resistance, high strength, and high flow. Examples of such compatibilized blends can be found in U.S. Pat. Nos. 4,315,086 (Ueno, et al); 4,659,760 (van der Meer); and 4,732,938 (Grant, et al). The properties of these blends can be further enhanced by the addition of various additives such as impact modifiers, flame retardants, light stabilizers, processing stabilizers, heat stabilizers, antioxidants and fillers.

The physical properties of PPE/ polyamide blends make them attractive for a variety of end-use articles in the automotive market, especially for various exterior components. Many of these components are subjected to a variety of abuses such as impacts and as such require outstanding impact resistance and ductility. Moreover, many of these same articles are preferentially produced using conversion techniques involving extrusion of sheet and forming of the sheet into articles. With today's high gloss paint systems highlighting surface imperfections and consumer emphasis on quality and cost, body panels and moldings need to have extremely good surface appearance at the least possible cost. Articles made from conventional PPE/polyamide blends have inadequate surface appearance and require secondary sanding and/or special paints to achieve the desired surface appearance. These additional steps add cost to the article and reduce the overall benefits associated with PPE/polyamide blends for these applications.

It is therefore apparent that a need continues to exist for methods to improve the surface appearance of articles formed from sheet made from PPE/ polyamide compositions such that the need for sanding and/or special paints is reduced.

SUMMARY OF THE INVENTION

The needs discussed above have been generally satisfied by the discovery of an improved method for enhancing the surface appearance characteristics of articles formed from sheet made from a PPE/ polyamide composition, wherein the method comprises:

(a) melt-mixing in a first step, from about 5% to less than 50% by weight polyphenylene ether resin with from about 0.7% to about 1.1% by weight of citric acid or a hydrate of citric acid and from about 5% to about 15% by weight of an elastomeric block copolymer, wherein the elastomeric block copolymer is a di-block copolymer, tri-block copolymer, or a mixture of a di-block copolymer and tri-block copolymer, wherein the copolymer comprises a polyarylene block and a saturated or unsaturated rubber block, with from about 5% to about 93% by weight of a polyamide resin, and (b) further melt mixing in a second step, from 0% to about 90% of a polyamide resin;

wherein the total weight of the polyamide resin is from about 45% to about 90% by weight based on the total weight of the composition; and wherein the amine endgroup to acid endgroup ratio (i.e., —$NH_2$/—$CO_2H$) is at least about 1.0 or greater.

In a preferred embodiment of the present invention, the PPE level is between about 35% and about 49% by weight, the citric acid level is between about 0.8% and about 1.0% by weight, the elastomeric block copolymer is present from about 8% to about 12% by weight, wherein elastomeric block copolymer contains a polystyrene-polybutadiene-polystyrene block copolymer, the polyamide is a nylon 6 resin present at a level between about 45% and about 55% by weight, wherein between about 10% and 15% of the nylon 6 is added with the PPE, the citric acid, and the elastomeric block copolymer with the remainder of the nylon 6 added in a second step; wherein all weight percentages are based on the total weight of the composition.

The description which follows provides further details regarding this invention.

DETAILED DESCRIPTION OF THE INVENTION

PPE, per se, are known polymers comprising a plurality of structural units of the formula (I):

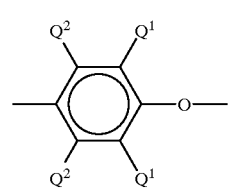

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The is preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer, provided a substantial proportion of free OH groups remains.

The PPE generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

The polyamide resins useful in the practice of the present invention are a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon 6,9, nylon 6/6T and nylon 6,6/6T with triamine contents below about 0.5 weight percent as well as others, such as the amorphous nylons may be useful for particular PPE-polyamide applications. Mixtures of various polyamides as well as various polyamide copolymers are also useful. The most preferred polyamide for the blends of the present invention is polyamide-6. Branched polyamide resins are also useful as are mixtures of branched and linear polyamide resins.

The polyamides can be obtained by a number of well-known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well terephthalic and isophthalic acids. Other useful diamines include m-xylyene diamine, di-(4-aminophenyl)methane, di-(4-aminocyclohexyl)methane; 2,2-di-(4-aminophenyl)propane, and 2,2-di-(4-aminocyclohexyl)propane. Copolymers of caprolactam with diacids and diamines are also useful.

Polyamides having viscosity number of about 90 to about 350 ml/g, preferably between about 110 and about 240 ml/g as measured in a 0.5 weight percent solution in 96 weight percent sulphuric acid in accordance with ISO 307 is preferred. In the practice of the present invention, it is preferred that the amine endgroup to acid endgroup ratio (i.e., —NH$_2$/—CO$_2$H) be $\geq$1.0. In a preferred embodiment, it is preferred that the amine endgroup to acid endgroup ratio (i.e., —NH$_2$/—CO$_2$H) be >1.0.

In the method of the present invention, a compatibilizing agent should be employed in the preparation of the composition. The two-fold purpose for using a compatilizing agent is to improve, in general, the physical properties of the PPE-polyamide resin blend, as well as to enable the use of a greater proportion of the polyamide component. When used herein, the expression "compatibilizing agent" refers to those polyfunctional compounds which interact with either the PPE, the polyamide resin, or both. This interaction may be chemical (e.g. grafting) or physical (e.g. affecting the surface characteristics of the dispersed phases). In either instance the resulting PPE-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatible without such agents, as taught in U.S. Pat. No. 3,379,792.

In the practice of the present invention, non-polymeric aliphatic polycarboxylic acids are used as the compatibilizing agent. Included in the group of non-polymeric aliphatic polycarboxylic acids species, also known as compatibilizers or functionalizers, are, for example, the aliphatic polycarboxylic acids, and acid esters represented by the formula (II)

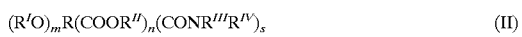

$$(R^{I}O)_m R(COOR^{II})_n (CONR^{III} R^{IV})_s \qquad (II)$$

wherein R is a linear or branched chain, saturated aliphatic hydrocarbon of from 2 to 20, preferably 2 to 10, carbon atoms; each $R^{I}$ is selected from the group consisting of hydrogen or an alkyl, aryl, acyl, or carbonyl dioxy group of 1 to 10, preferably 1 to 6, most preferably 1 to 4, carbon atoms, with hydrogen being especially preferred; each $R^{II}$ is independently selected from the group consisting of hydrogen or an alkyl or aryl group of from 1 to 20 carbon atoms preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero; and wherein $(OR^{I})$ is alpha or beta to a carbonyl group and at least two carbonyl groups are separated by 2 to 6 carbon atoms. Obviously, $R^{I}$, $R^{II}$, $R^{III}$, and $R^{IV}$ cannot be aryl when the respective substituent has less than 6 carbon atoms.

Illustrative of suitable polycarboxylic acids are citric acid, malic acid, and agaricic acid; including the various commercial forms thereof, such as, for example, the anhydrous and hydrated acids. Illustrative acid esters useful herein include, for example, acetyl citrate and mono- and/or distearyl citrates and the like. Suitable acid amides useful herein include, for example, N,N'-diethyl citric acid amide; N,N'-dipropyl citric acid amide; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Examples of suitable functionalizing compounds can be found in U.S. Pat. Nos. 4,315,086, 4,755,566, 4,873,286 and 5,000,897.

The amount of the above mentioned non-polymeric aliphatic polycarboxylic acids that is required to appropriately functionalize the PPE is that which is sufficient to improve the compatibility between the various components in the composition and improve the surface characteristics of the composition without loss of desirable properties such as, for example, impact properties, tensile properties, surface appearance, and the like. As previously discussed, indications of improved compatibility include resistance to lamination, improved physical properties such as increased tensile and impact properties and a stabilized morphology between the blend component phases under static and/or low shear conditions.

It is thought that reactions can occur between some of the components of the composition, for example, between the PPE and the non-polymeric aliphatic polycarboxylic acids, the non-polymeric aliphatic polycarboxylic acids and the polyamide resin, or between the PPE, non-polymeric aliphatic polycarboxylic acid, and the polyamide resin. These reactions are thought to lead to various copolymers between the components of the blend. In this manner, as the non-polymeric aliphatic polycarboxylic acid is added to a PPE/polyamide composition, the average particle size of the dispersed PPE phase decreases presumably due to the formation of the copolymer structures. It is believed that a reduction in the number of PPE particles, in the formed articles, having an average particle diameter of about 10 microns or greater is responsible for the improvement in the overall surface appearance. There appears to be a minimum threshold level of non-polymeric aliphatic polycarboxylic acid that is required to achieve the desired compatibility between the PPE and the polyamide as indicated by enhanced physical properties yet which results in sufficient numbers of relatively larger PPE particles that lead to surface imperfections. An increase in the level of non-polymeric aliphatic polycarboxylic acid above the minimum has a positive effect on enhancing the compatibility but unexpectedly has been discovered to have a significant effect on improving the surface characteristics of the blend.

In the practice of the present invention, an effective amount of the above mentioned non-polymeric aliphatic polycarboxylic acids, based on the total weight of the composition, is from about 0.6% to about 1.2% by weight, preferably from about 0.7% to about 1.0% by weight. Amounts less than about 0.6% by weight result sufficient numbers of PPE particles having an average diameter greater than about 10 microns such that an article formed from a sheet of the compatibilized PPE/ polyamide composition has unacceptable surface appearance with respect to pits and grits. Amounts in excess of about 1.2% by weight afford increased flow characteristics but at the expense of low temperature impact strength and the color of the composition darkens considerably.

The method according to the invention incorporates in the composition one or more additional impact modifiers. All impact modifiers as generally used for compositions comprising a polyphenylene ether, a polyamide or a combination of a polyphenylene ether and a polyamide can be used. Particularly suitable are the so called block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful in the present compositions.

Suitable A-B and A-B-A type block copolymers are disclosed in, for example, U.S. Pat. Nos. 3,078,254, 3,402,159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly(α-methylstyrene)-polybutadiene, polystyrene-polybutadiene-polystyrene (SBR), polystyrene-poly(ethylene-propylene)-polystyrene, polystyrene-polyisoprene-polystyrene and poly(α-methylstyrene)-polybutadiene-poly(α-methylstyrene), as well as the selectively hydrogenated versions thereof. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON.

In the method of the present invention, the amount of PPE is important in achieving the desired surface appearance in an articles formed from a sheet of a compatibilized PPE/polyamide composition. The amount of PPE in the present invention is between about 5% and less than 50% by weight, preferably between about 35% and about 49% by weight, and most preferably between about 40% and 48% by weight, wherein the weight percentages are based on the entire weight of the composition. Conventional wisdom dictates that the amount of PPE in the composition be as large as possible with retention of the PPE as the dispersed phase and the polyamide as the continuous phase. Maximizing the level of PPE results in maximizing the overall dimensional stability of the PPE/polyamide composition, a very desirable affect. Contrary to this conventional wisdom, it was unexpectedly found that when the amount of PPE in the composition is 50% by weight or greater that the surface appearance of an article formed from a sheet of the compatibilized PPE/polyamide composition is unacceptable with respect to the number of pits and grits. Pits and grits are terms of art and refer to various surface imperfections. Pits are generally bumps of varying sizes and shapes and grits are generally small holes or depressions on the surface of the composition. In the practice of the present invention, the amount of the polyamide is between about 35% and about 90% by weight, preferably between about 36% and about 60% by weight, and most preferably between about 37% and 55% by weight, wherein the weight percentages are based on the entire weight of the composition.

A useful amount of impact modifier is between about 5% and about 15% by weight, preferably between about 8% and about 12% by weight, wherein the weight percentages are based on the entire weight of the composition. In an especially preferred embodiment, the impact modifier comprises a polystyrene-polybutadiene-polystyrene block copolymer.

Compositions of the present invention can also include effective amounts of at least one additive selected from the group consisting of anti-oxidants, flame retardants, drip retardants, dyes, pigrnents, colorants, stabilizers, small particle mineral such as clay, mica, and talc, antistatic agents, plasticizers, lubricants, and mixtures thereof. These additives are known in the art, as are their effective levels and methods of incorporation. Effective amounts of the additives vary widely, but they are usually present in an amount up to about 50% or more by weight, based on the weight of the entire composition. Especially preferred additives include hindered phenols, thio compounds and amides derived from various fatty acids. The preferred amounts of these additives generally ranges up to about 2% total combined weight based on the total weight of the composition.

The preparation of the compositions of the present invention is normally achieved by merely blending the ingredients under conditions for the formation of an intimate blend. Such conditions often include mixing in single or twin screw type extruders or similar mixing devices which can apply a shear to the components.

All of the ingredients may be added initially to the processing system, or else certain additives may be precompounded with one or more of the primary components, preferably the PPE, impact modifier and the polyamide. It appears that certain properties, such as impact strength and elongation, are sometimes enhanced by initially precompounding the PPE and impact modifier, optionally with any other ingredients, prior to compounding with the polyamide resin, however, these improvements are done at the expense of increasing the viscosity of the compatibilized composition. In the present invention, it is preferable that at least 5% by weight, preferably at least 8% by weight, and most preferably, at least 10% by weight polyamide be added with the PPE and non-polymeric carboxylic acid. The remaining portion of the polyamide is fed through a port downstream. In this manner, the viscosity of the compatibilized composition is reduced without significant reduction in other key physical properties. While separate extruders may be used in the processing, these compositions are preferably prepared by using a single extruder having multiple feed ports along its length to accommodate the addition of the various components. It is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

It should be clear that compositions and articles made from the compositions made by the method of this disclosure are within the scope of the invention.

All patents and patent applications cited are incorporated herein by reference.

The invention will be further illustrated by the following examples.

EXPERIMENTAL

In the examples the following materials have been used:
PPE: a poly(2,6-dimethyl-1,4-phenylene ether) with an intrinsic viscosity of 45 ml/g as measured in toluene at 25° C. and a concentration of 0.6 gram per 100 ml;
PA-6: a polyamide-6 with a viscosity of 54–62 ml/g according to ASTM D789 in a solution of 8.4% by weight of nylon in 90% Formic Acid and an amine endgroup number of 72 μeq./g.;
CAH: citric acid monohydrate;
SEBS: polystyrene-poly(ethylene-butylene)-polystyrene block copolymer;

The ingredients were compounded in the weight ratios as indicated in the following table in a twin-screw extruder with temperature settings over the length of the extruder between about 280 and about 310° C. The screw speed was 300 rpm, the throughput 10 kilograms per hour. All ingredients with exception of the polyamide were fed at the throat of the extruder; the polyamide was split-fed partially into the throat of the extruder with the remainder fed downstream about halfway the length of the extruder. The strands coming from the extruder were pelletized in a laboratory equipment and dried for about 3 hours at about 110° C. The dried pellets were injection molded into standard ASTM test specimens for measurement of physical properties. Sheets were extruded through a slit die and articles were thermoformed from the sheets for evaluation of surface appearance, especially for the number and severity of the imperfections (i.e., lumps and bumps).

| Sample: | 1 | 2 | 3 | 4 |
|---|---|---|---|---|
| PPE | 42 | 47 | 50 | 55 |
| CAH | 0.9 | 0.9 | 0.9 | 0.9 |
| SEBS | 10 | 10 | 10 | 10 |
| PA-6[1] | 10 | 10 | 10 | 10 |
| PA-6[2] | 38 | 33 | 30 | 25 |
| Properties | | | | |
| HDT[3] | 358.5 | 366.4 | 366.1 | 365.7 |
| NI[4] | 13.84 | 13.34 | 11.21 | 10.15 |
| Dyn.[5] (73° F.) | 33.1 | 34.2 | 35.8 | 37.7 |
| Dyn. (−20° F.) | 32.5 | 31.0 | 34.0 | 37.1 |
| TS[6] | 8.39 | 8.59 | 8.65 | 8.66 |
| TE[7] | 105 | 148 | 127 | 139 |
| FM[8] | 300.6 | 304.6 | 308.9 | 297.8 |
| FY[9] | 1251 | 1273 | 1300 | 1272 |
| Surface appearance | OK | OK | Not OK | Not OK |

[1]denotes amount of PA-6 added with the PPB; [2]denotes amount of PA-6 added downstream; [3]HDT is reported in ° F. and was measured at a load of 66 psi as measured according to ASTM D648, [4]NI stands for notched Izod impact reported in ft-lbs/in and tested according to D256; [5]Dyn. stands for Dynatup impact strength (energy to fracture falling dart test) reported in ft-lbs and measured according to D3763; [6]TSstands for tensile strength at yield reported in Kpsi and measured according to ASTM D638; [7]TE stands for tensile elongation at break reported in percent and measured according to ASTM D638; [8]FM stands for flexural modulus and is reported in Kpsi and measured according to ASTM D790; [9]FY stands for flexural yield and is reported in Kspi and measured according to ASTM D790. All compositions contain the following additives: 0.3 weight percent Seenox412S, 0.3 weight percent Irganox 1010, and 0.3 weight percent KI; wherein all weight are based upon the total weight of the composition.

As can be seen from the properties of the compositions presented in the table, the basic physical properties of all four samples are fairly constant between the samples. However, the surface appearance of articles formed from sheets of the compositions differ dramatically for the compositions containing 50 weight percent or more PPE (e.g., samples 3 and 4). Articles made from compositions 3 and 4 had unacceptable levels of pits and grits whereas articles made from compositions 1 and 2 had acceptable surface appearances with respect to the number of pits and grits.

Microscopic examination of the compositions revealed that the acceptable articles exhibited morphologies wherein the PPE particles were very uniform in size and shape with an average particle diameter of less than about 2 microns. Also, very importantly, the acceptable compositions had very few PPE particles that were 10 microns or greater in diameter. It was believed that the relatively large (i.e., 10 micron or greater diameter) PPE particles were what lead to the surface imperfections and that the minimization of the number of these particles resulted in the dramatic improvement in the surface appearance in the articles. It should be apparent that the present invention affords a method for reducing the number of PPE particles having an average diameter of 10 microns or greater. It should also be apparent that the present invention affords a method for improving the uniformity of the PPE particles in compatibilized PPE/polyamide compositions. It should also be apparent that the present invention affords a method for reducing the average particle size of the PPE particles in compatibilized PPE/polyamide compositions.

It is important to note that injection molded specimens and extruded sheet from all four compositions exhibited very good and acceptable surface appearances. However, when articles are formed from the sheets the differences in the number and severity of the surface defects becomes readily apparent between the compositions. Although evaluation of surface appearance of the articles is somewhat subjective in nature, one of ordinary skill in this art can readily evaluate and appreciate the unexpected improvements in the surface appearance of articles formed from sheets of the compositions made by the practice of this invention. Typically, the method of the invention reduces by at least about 50% the number of surface imperfection having a size of greater than 10 microns over articles made from compositions having PPE concentrations at higher levels. Optimization of the method can be obtained by one of ordinary skill in this art from the present disclosure of the invention without undue experimentation.

I claim:

1. A method for enhancing the surface appearance characteristics of articles formed from sheet made from a compatibilized polyphenylene ether resin/polyamide resin composition, wherein the method comprises:

(a) melt-mixing in a first step, from about 35% to about 49% by weight polyphenylene ether resin with from about 0.8% to about 1.0% by weight of a non-polymeric aliphatic polycarboxylic acid or derivative thereof and from about 8% to about 12% by weight of an elastomeric block copolymer, wherein the elastomeric block copolymer is a di-block, tri-block, or a mixture of a di-block and a tri-block, wherein the copolymer comprises a polyarylene block, with from about 10% to about 15% by weight of polyamide resin wherein all weights are based on the total weight of the final composition, and (b) further melt mixing in a second step additional polyamide resin;

wherein the total weight of the polyamide resin is from about 45% to about 55% by weight based on the total weight of the final composition; and wherein the polyamide resin is a nylon-6 resin, and wherein the polyamide resin has an amine endgroup to acid endgroup ratio of at least about 1.0.

2. The method of claim 1, wherein the method is done in an extruder and wherein the first step and the second step are done sequentially in the same extruder.

3. The method of claim 1, wherein the non-polymeric aliphatic polycarboxylic acid or derivative thereof is citric acid or a hydrate of citric acid.

4. The method of claim 1, wherein the amount of polyphenylene ether resin is from about 40% to about 48% by weight.

5. The method of claim 1, further comprising melt mixing in the first step, at least one additive selected from the group consisting of anti-oxidants, flame retardants, drip retardants, dyes, pigments, colorants, stabilizers, antistatic agents, plasticizers, lubricants, and mixtures thereof.

6. A composition made from the method of claim 1.

7. An article formed out of the composition of claim 6.

8. The method of claim 1, wherein the method reduces in the articles, the number of surface imperfections by at least about 50%, the surface imperfections having a size of greater than 10 microns over the number of imperfections having a size of greater than 10 microns in articles made from compositions having levels of 50% by weight or greater polyphenylene ether resin based on the weight of the entire composition.

* * * * *

UNITED STATES PATENT AND TRADEMARK OFFICE
CERTIFICATE OF CORRECTION

PATENT NO.   : 6,180,716B1  
DATED        : March 18, 1998  
INVENTOR(S)  : B. Majumdar Page 1 of 1

It is certified that error appears in the above-identified patent and that said Letters Patent is hereby corrected as shown below:

<u>Title page,</u>  
Under References Cited, FOREIGN PATENT DOCUMENTS, list:  
EP   0597648A1   5/1994   European Patent Office  
WO   08505372A   5/1985   International Signed and Sealed this Eighteenth Day of December, 2001

Attest:

Attesting Officer

JAMES E. ROGAN  
Director of the United States Patent and Trademark Office